(12) United States Patent
Googe, Jr. et al.

(10) Patent No.: US 6,591,782 B1
(45) Date of Patent: Jul. 15, 2003

(54) FIELD WATERING DEVICE FOR GAME BIRDS

(76) Inventors: Howard E. Googe, Jr., 401 E. Osceola St., First Fl., River Oak Center, Stuart, FL (US) 34994; James Edward Melear, 3455 Court Dr., Stuart, FL (US) 34997; Kenneth Rogers, 401 E. Osceola St., First Fl., River Oak Center, Stuart, FL (US) 34994

(*) Notice: Subject to any disclaimer, the term of this patent is extended or adjusted under 35 U.S.C. 154(b) by 0 days.

(21) Appl. No.: 10/052,778

(22) Filed: Jan. 23, 2002

(51) Int. Cl.⁷ ............................................. A01K 39/02
(52) U.S. Cl. ..................... 119/72.5; 119/74; 119/786
(58) Field of Search .................... 119/72.5, 72, 69.5, 119/74, 769, 784, 786, 787, 788

(56) References Cited

U.S. PATENT DOCUMENTS

| | | | |
|---|---|---|---|
| 1,903,767 A | | 4/1933 | Karst |
| 1,918,566 A | | 7/1933 | Sadleir |
| 2,510,252 A | | 6/1950 | Pine |
| 2,775,227 A | | 12/1956 | Millies ..................... 119/72.5 |
| 2,921,556 A | | 1/1960 | Nilsen ........................ 119/74 |
| 3,263,652 A | * | 8/1966 | Nakajima .................. 119/72.5 |
| 3,537,430 A | | 11/1970 | Peppler ..................... 119/72.5 |
| 3,664,305 A | * | 5/1972 | Hart et al. ..................... 119/72 |
| 4,173,948 A | | 11/1979 | Austin ......................... 119/72 |
| 4,188,914 A | | 2/1980 | Lage ........................... 119/71 |
| 4,543,912 A | * | 10/1985 | Steudler, Jr. ................ 119/475 |
| 4,753,196 A | | 6/1988 | Lack et al. .................... 119/72 |
| 4,787,337 A | | 11/1988 | Mayer ......................... 119/18 |
| 4,794,881 A | | 1/1989 | Rader ........................ 119/72.5 |
| 4,892,061 A | * | 1/1990 | Steudler, Jr. ................ 119/72.5 |
| 5,146,873 A | | 9/1992 | Gray ............................ 119/73 |
| 5,154,138 A | * | 10/1992 | Siddiqui et al. ........... 119/72.5 |
| 5,222,462 A | | 6/1993 | Steudler, Jr. ............... 119/72.5 |
| 5,230,302 A | | 7/1993 | Steudler, Jr. ................. 119/72 |
| 5,282,440 A | * | 2/1994 | Hostetler ..................... 119/72 |
| 5,494,000 A | | 2/1996 | Tanabe ...................... 119/72.5 |
| 5,628,276 A | * | 5/1997 | Raposa ........................ 119/61 |
| 5,794,560 A | * | 8/1998 | Terenzi .................... 119/51.11 |
| 5,857,429 A | | 1/1999 | Hostetler ................... 119/72.5 |
| 5,937,787 A | * | 8/1999 | Kopis ........................ 119/52.2 |
| 5,996,530 A | | 12/1999 | Miller et al. ............... 119/51.5 |
| 6,170,435 B1 | * | 1/2001 | Momont et al. ........... 119/51.5 |
| 6,318,290 B1 | * | 11/2001 | Fisher ....................... 119/51.5 |
| 6,401,656 B1 | * | 6/2002 | Adkisson ................. 119/51.01 |

OTHER PUBLICATIONS

Covey Base Camp Advertisement, May–Jun. 2001.

* cited by examiner

*Primary Examiner*—Yvonne Abbott
(74) *Attorney, Agent, or Firm*—Wenderoth, Lind & Ponack, L.L.P.

(57) ABSTRACT

A field watering device for game birds, particularly quail, is provided, which has a body for holding water, a ground anchor portion for securely fixing the body into the ground, and at least one water dispensing nipple for dispensing water from the body to the game birds. The field watering device uses conventional water dispensing nipples such as used to dispense water to the young birds in their commercial pens. When the young birds are released into the wild, the birds have an enhanced survival rate using the field watering device, since they are accustomed to obtaining water from the nipples. Without the field watering device, there is a higher loss of birds due to their unfamiliarity with natural water sources.

19 Claims, 3 Drawing Sheets

FIELD WATERING DEVICE FOR GAME BIRDS

BACKGROUND OF THE INVENTION

1. Field of the Invention

This invention is directed to a field watering device for game birds, particularly quail.

2. Description of Related Art

Many watering systems are known for animals, particularly for poultry. The majority of watering systems are directed to poultry watering systems which are suspended within a caging system and are connected to a continuous water supply.

The present invention differs from these systems in that it is driven into the ground rather than being suspended. The present invention differs further from these systems in being constructed of a vertical tank having a limited number of water dispensing pipes through which water is dispensed from a limited number of nipples, in contrast to an extensive system having a large number of water dispensing pipes and nipples. The present invention differs even further in containing a self-contained water tank and is not connected to a continuous water supply.

U.S. Pat. No. 4,188,914 teaches a watering device for small pigs and the like. The device is a substantially vertical tank having 2 nipples and is not connected to a continuous water supply. However unlike the present invention, the device is constructed of two containers 12 and 12(a) which are identical, and when placed together, a slot indentation 34 is created therebetween, enabling the containers to be mounted on a partition 42. In addition, the device lacks a ground anchor portion for securing the device into the ground.

U.S. Pat. No. 2,510,252 teaches another watering device for fowl. The device is constructed of a vertical rectangular tank 41, which is supported by a shelf 42 fixed to the interior surface of a wall 43 of a building or chicken coop. The tank has a single port out of which horizontally projects a single narrow pipe to which is attached a set of four drip valves. Thus, the device lacks a ground anchor portion for securing the device into the ground, and it is materially different from the present invention in the number of ports, horizontal pipes, nipples and nipple structures.

U.S. Pat. No. 1,903,767 is directed to a drinking fountain for poultry. The device has a tank "of desired capacity and supported as desired in any manner preferred". The patent does not specifically teach or suggest that the tank include a ground anchor portion for securing the device into the ground. The device further differs from the present invention in being connected to a continuous water supply, and in including a float controlled valve 4 for maintaining a constant water level in the tank.

SUMMARY OF THE INVENTION

The present invention provides a field watering device for game birds, particularly quail. The device comprises a body for holding water, a ground anchor portion connected to the body for securing the body into the ground, and having at least one water dispensing nipple for dispensing water from the body to the game birds. The object of the present invention is to provide a watering device for commercially raised game birds like quail. The birds are raised in flying pens, where they obtain water through a watering system which incorporates a conventional water dispensing nipple. See for example U.S. Pat. No. 3,537,430, which is incorporated herein by reference. When pecked, the water dispensing nipples meter out water to the birds. When the birds are of sufficient age, the birds are released into the wild. The birds are unfamiliar with natural water sources, such as morning dew, lakes, streams, etc. This unfamiliarity results in a significant loss of young birds through dehydration, sickness and death. The present invention provides a field watering device using a water dispensing nipple similar or identical to the water dispensing nipples used by the birds in their commercial pens. Hence the released quail can obtain water in the manner they were accustomed to when raised, thus enhancing the survival of the birds until they become acclimated to using water sources in their environment.

DETAILED DESCRIPTION OF PREFERRED EMBODIMENTS

Figure 1:
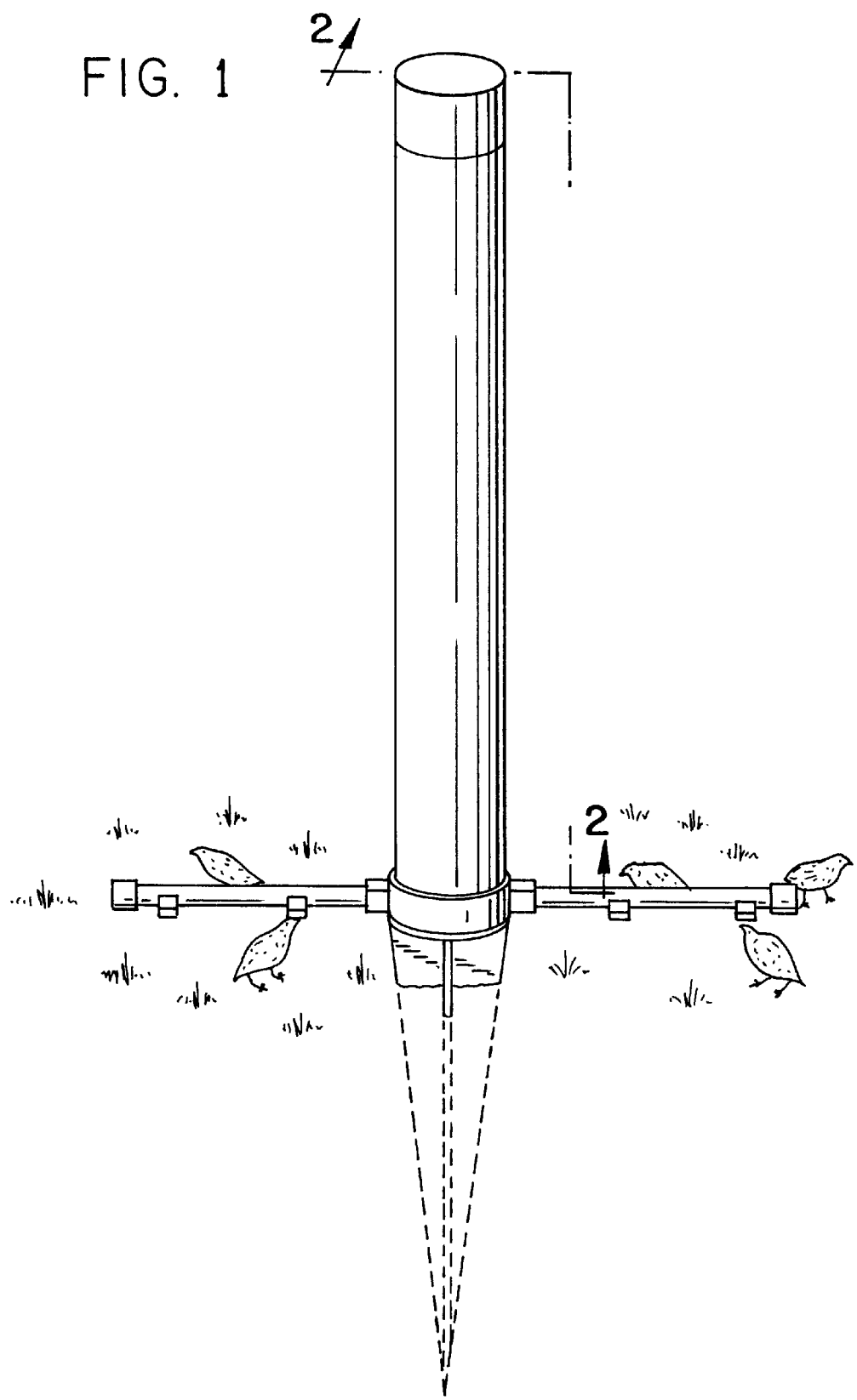
FIG. 1 is a front perspective view of a preferred embodiment of the field watering device for quail of this invention, showing the device securely fixed into the ground.
Figure 2:
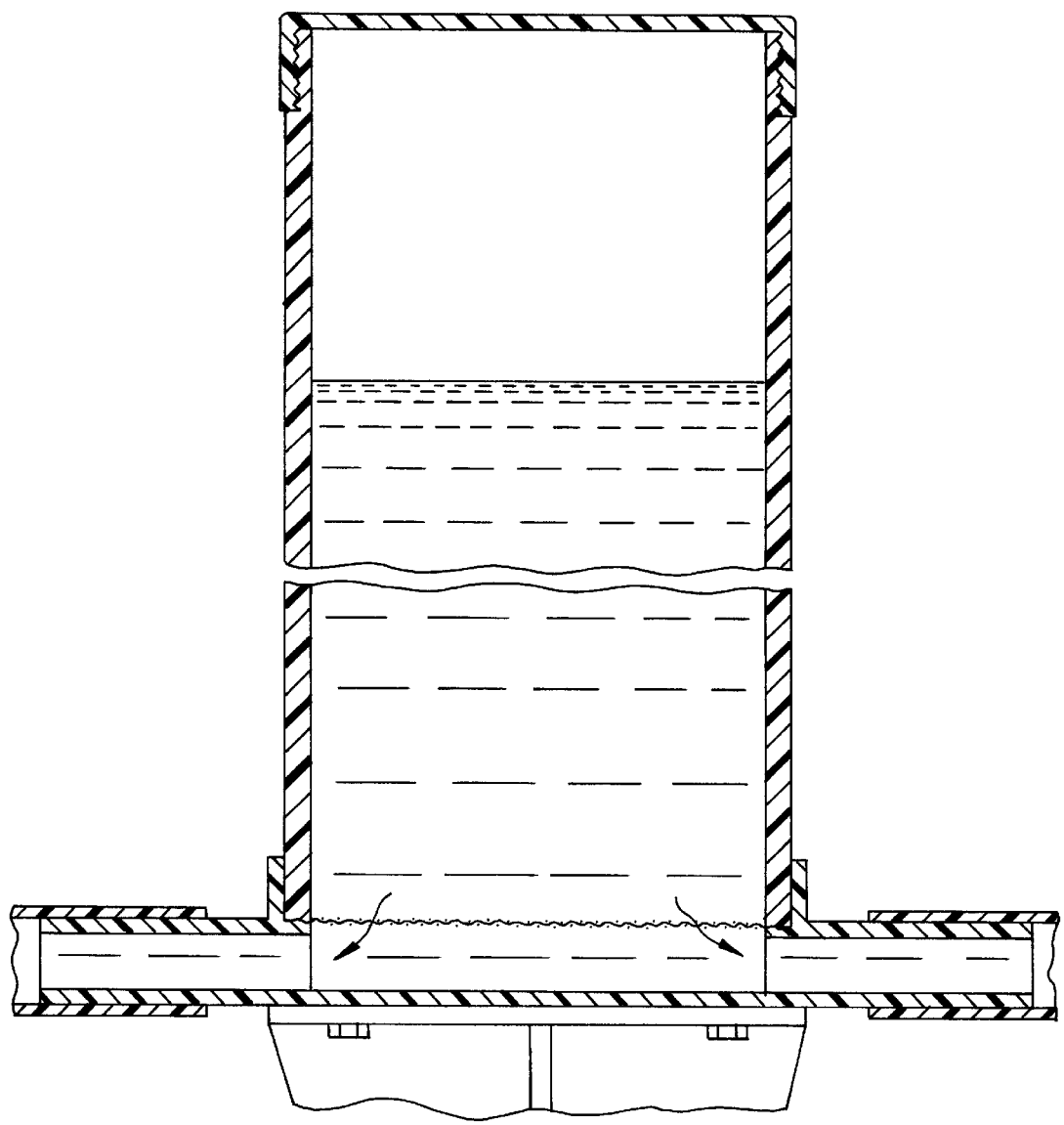
FIG. 2 is a vertical cross-sectional view of the field watering device shown in FIG. 1.

The present invention provides a field watering device for game birds, particularly quail. The device comprises a body for holding water, a ground anchor portion connected to the body for securely fixing the body into the ground, and having at least one water dispensing nipple for dispensing water from the body to the game birds. See FIG. 1.

The body may be any shape and orientation. Preferably the body is a substantially vertical hollow tank for holding water. The body may be any configuration in cross-section. Preferably the body is circular or square in horizontal cross-section. The body may be any suitable dimensions, such as 3 inches to 12 inches wide and 2 feet to 5 feet in height. Preferably the body is about 6 inches in diameter and about 42 inches in height.

The body may be comprised of any suitable material such as plastic, metal, or a combination thereof. Preferably the body is comprised of PVC. Alternatively the body may be injection molded from any suitable synthetic resin.

Figure 3:
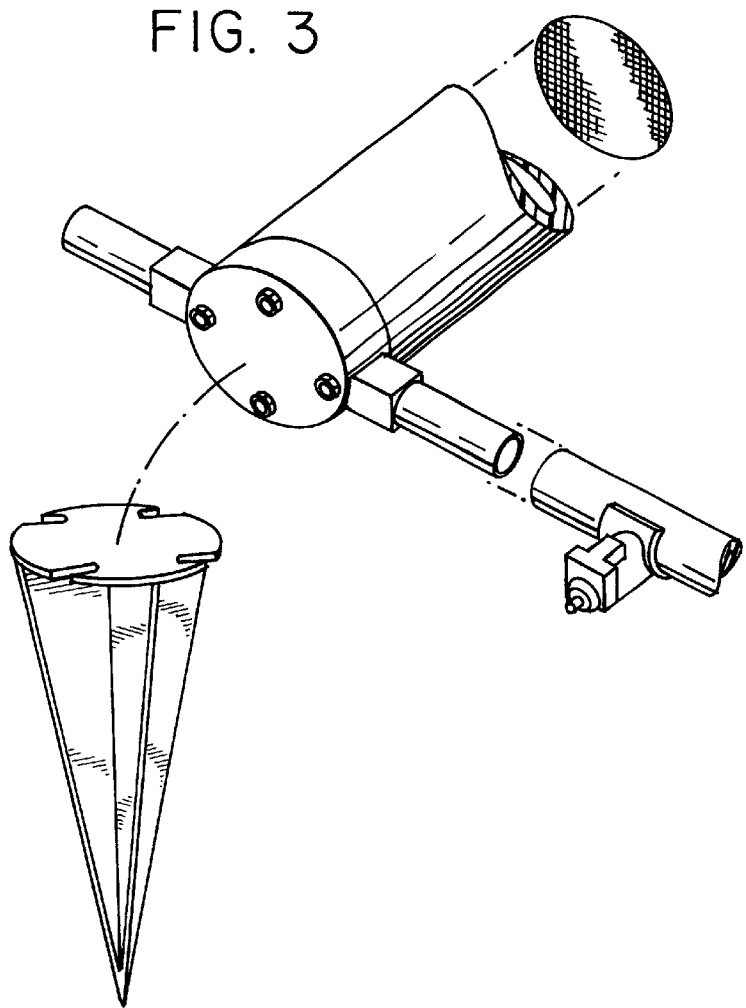
FIG. 3 is a bottom perspective view of the field watering device according to FIG. 1, showing the ground anchor portion in a detached condition from the body for holding water.

The ground anchor portion may be any construction and design which can securely fix the body into the ground. Preferably the ground anchor portion is a base connected to the lower portion of the body for holding water. The base may include a flat upper surface for securing the base to the lower body portion, and one or more pointed projections on the opposed side of the base for driving the base into the ground. For example the base may be a separate component which is attached to the body using nuts and bolts or other suitable connection means. See FIG. 3. To secure the field watering device to the ground, the flat upper surface of the base is hammered into the ground. The body is then connected to the base using bolts and nuts or other conventional connectors. In such preferred embodiment the base is constructed of hard plastic or metal having a single triangular pointed projection for driving into the ground.

Alternatively, the body and base may be injection molded as a single piece. In such embodiment, the base may be secured to the ground by, for example, hammering the upper surface of the water holding body.

In another embodiment, the ground anchor portion is one or more stakes or rods which are secured to the ground and connected to the water holding body. For example, the body for holding water may be secured to the ground by two stakes, spikes or steel rods which are disposed vertically along and on opposite sides of the body for holding water, connected to the body by any suitable means including metal bands, rings, tape, etc. Alternatively the stakes, spikes or rods may be a structure integrally attached or injection molded into the body which enables the body to be secured to the ground.

Figure 4:
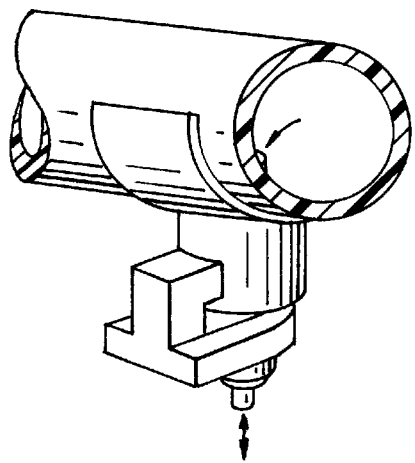
FIG. 4 is an enlarged perspective view of the water dispensing nipple shown in FIGS. 1 and 3.

The body is provided with at least one water dispensing nipple for dispensing water to the game birds. The water dispensing nipple may project directly from the body. Preferably one or more water dispensing nipples are attached to at least one pipe projecting horizontally from the body. See FIG. 4. More preferably the body includes one horizontal pipe having 1 to 6 water dispensing nipples. Even more preferably the one horizontal pipe has 2 water dispensing nipples which is sufficient for watering 20 quail. Alternatively, the body has two horizontal pipes each having 1 to 6 water dispensing nipples. Preferably each of said two horizontal pipes has 1 water dispensing nipple.

The horizontal pipe or pipes are disposed at a height from the ground within reach of the young game birds for drinking, preferably about 3 to 7 inches above the ground, more preferably about 5 inches above the ground. The horizontal pipe or pipes are any suitable diameter, preferably ½ inch to 1 inch in diameter, more preferably about ¾ inch in diameter. The length of the horizontal pipe or pipes is between 1 and 12 inches in length. Preferably the length is shorter than 12 inches, to avoid the pipes being knocked off by wild or domestic animals such as cows or pigs.

The horizontal pipe or pipes are attached to the body in any suitable means. If the body is injection molded, the pipe or pipes are preferably integrally formed with the body by injection molding. Alternatively if the body is constructed of separate components such as PVC, the pipe or pipes are attached to the body through a port opening in the body using any conventional means such as PVC glue, epoxy resin or threaded couplings.

The body may be any color. Preferably the body is camouflage colored. More preferably the body is colored green, brown, black, grey, or any mixture of said colors.

The water dispensing nipples used in the present invention are conventional in the art of watering systems. Preferably the water dispensing nipple is the type which is attached to the lower side of a water conveying pipe and comprises, inter alia, a vertical pin which dispenses water when the game bird presses its beak upwardly against the pin.

The body includes any suitable opening for filling the body with water. Preferably the upper portion of the body is provided with a threaded end for closure with a screw off cap.

The field watering device may optionally include a screen filter disposed between the body and the water dispensing nipple for filtering debris in the water tank which may block the nipples from dispensing water. Preferably the screen filter is a wire or plastic mesh which is disposed at the juncture where the horizontal pipe joins the body.

We claim:

1. A field watering device for game birds, which comprises:
   a body for holding water,
   a ground anchor portion having at least one pointed projection for driving and securely fixing said body into the ground, and
   at least one water dispensing nipple for dispensing water downwardly out of said nipple to the game birds.

2. The field watering device according to claim 1, wherein said body is a substantially vertical hollow tank.

3. The field watering device according to claim 1, wherein said body is comprised of PVC.

4. The field watering device according to claim 1, wherein said body is injection molded and is comprised of a synthetic resin.

5. The field watering device according to claim 1, wherein said body is circular or square in horizontal cross-section.

6. The field watering device according to claim 1, wherein said ground anchor portion is connected to said body.

7. The field watering device according to claim 1, wherein said ground anchor portion is integrally formed by injection molding with said body.

8. The field watering device according to claim 1, wherein said body includes at least one pipe projecting horizontally from said body to which the at least one water dispensing nipple is attached.

9. The field watering device according to claim 8, wherein said horizontal pipe is about ¾ inch in diameter.

10. The field watering device according to claim 8, wherein said horizontal pipe is integrally formed with said body by injection molding.

11. The field watering device according to claim 8, wherein said horizontal pipe is connected to said body through a port opening in said body.

12. The field watering device according to claim 8, wherein said horizontal pipe is between 1 and 12 inches in length.

13. The field watering device according to claim 1, wherein said body includes one horizontal pipe having 1 to 6 water dispensing nipples.

14. The field watering device according to claim 13, wherein said horizontal pipe has 2 water dispensing nipples.

15. The field watering device according to claim 1, wherein said body has two horizontal pipes each having 1 to 6 water dispensing nipples.

16. The field watering device according to claim 15, wherein each of said two horizontal pipes has 1 water dispensing nipple.

17. The field watering device according to claim 1, wherein said body is about 6 inches in diameter and about 42 inches in height.

18. The field watering device according to claim 1, wherein said body includes a threaded end at its upper portion for closure with a screw off cap.

19. The field watering device according to claim 1, wherein a screen filter is disposed between said body and said water dispensing nipple.

* * * * *